June 24, 1958   E. E. COULTER ET AL   2,840,182
EVAPORATOR COOLER AND METHOD EFFECTED THEREBY
Filed July 29, 1954   4 Sheets-Sheet 4

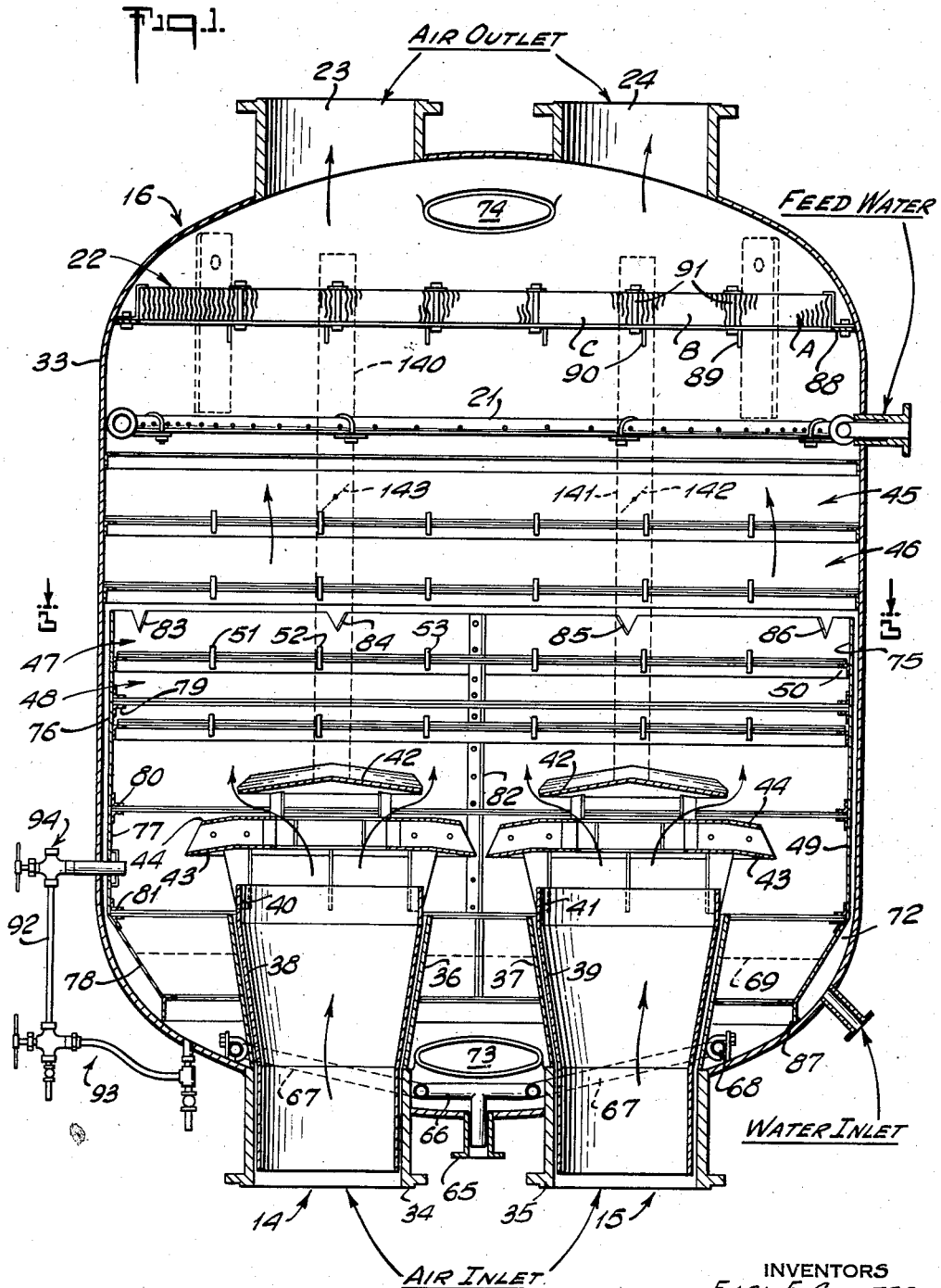

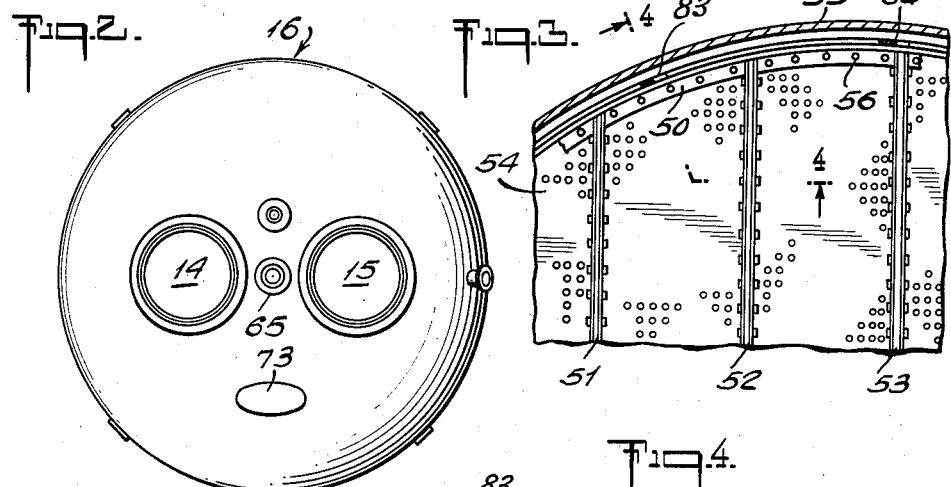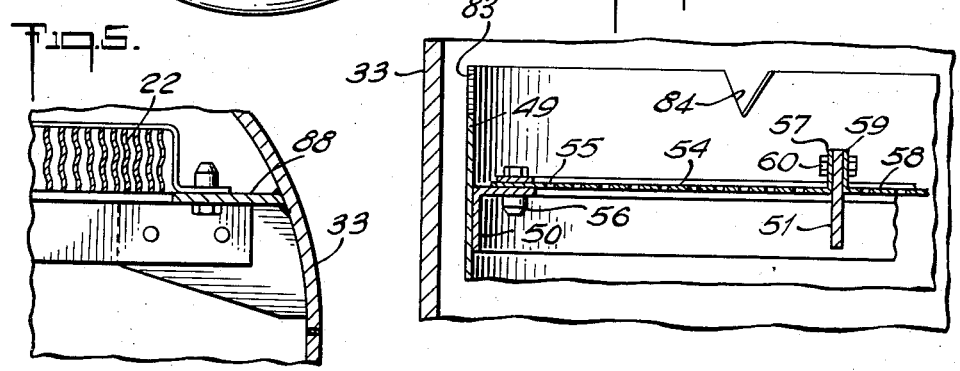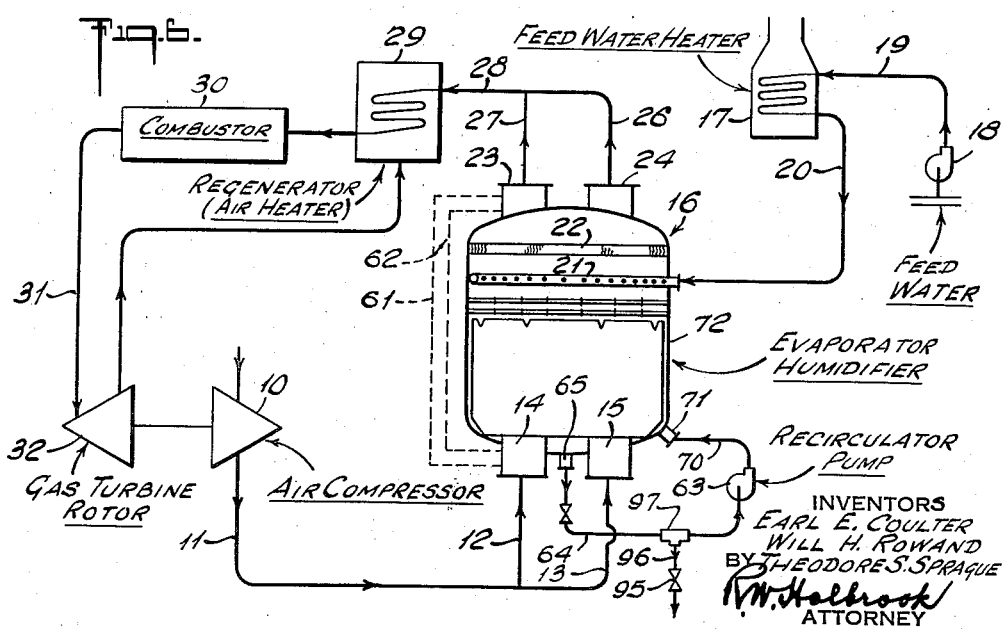

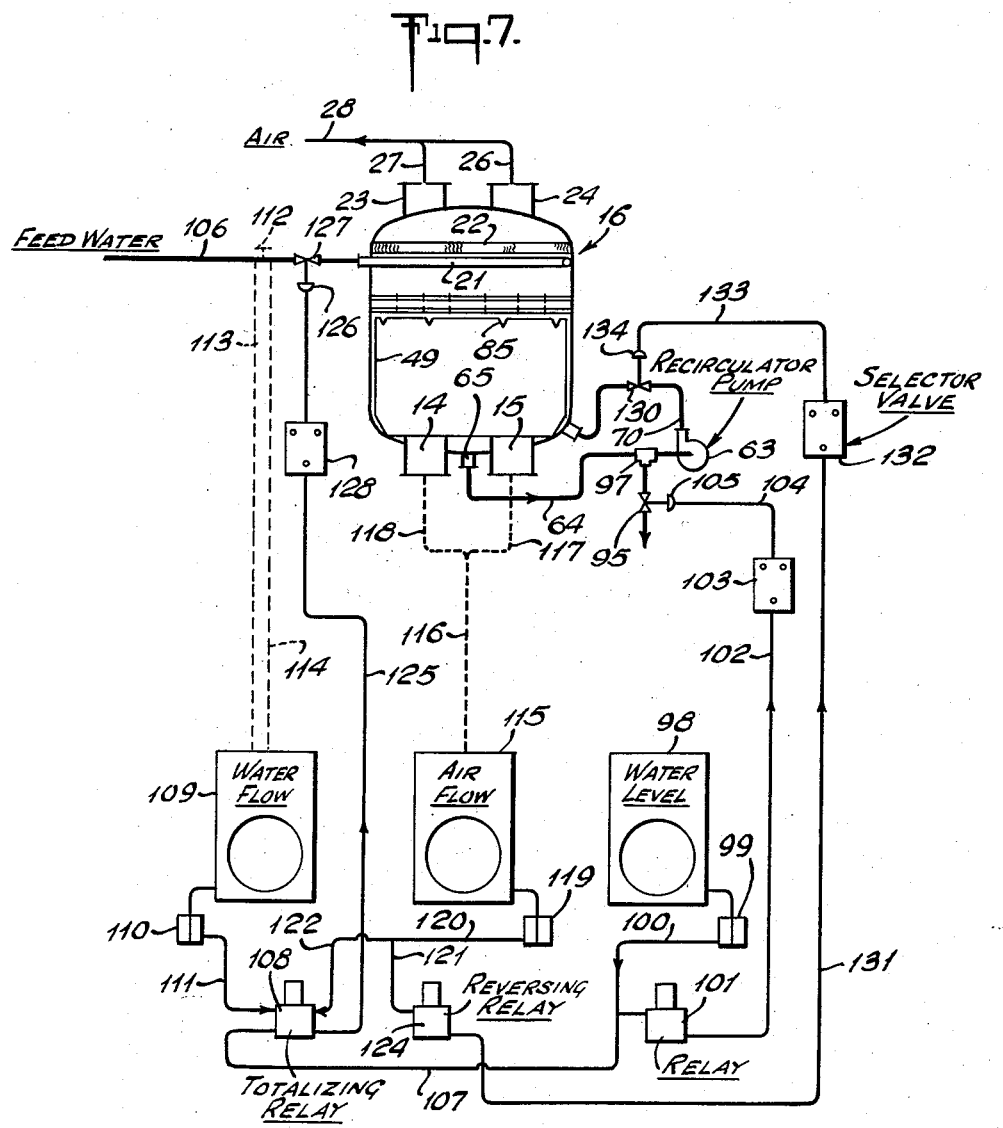

INVENTORS
EARL E. COULTER
WILL H. ROWAND
BY THEODORE S. SPRAGUE
ATTORNEY

United States Patent Office 2,840,182
Patented June 24, 1958

2,840,182

EVAPORATOR COOLER AND METHOD EFFECTED THEREBY

Earl E. Coulter, Deerfield, Ohio, Will H. Rowand, Short Hills, N. J., and Theodore S. Sprague, Hewlett, N. Y., assignors to The Babcock & Wilcox Company, New York, N. Y., a corporation of New Jersey Application July 29, 1954, Serial No. 446,464

11 Claims. (Cl. 183—26)

This invention relates to an evaporator-cooler unit or evaporator-humidifier unit adapted to function as a unit in the regenerative cycle of a gas turbine power plant.

The unit of the invention takes air from a gas turbine compressor, saturates that air with water vapor, and cools it, before entry of the air to the regenerator, on its way to the combustor.

The evaporator unit of the invention receives air under a pressure, for example, of 90# p. s. i. a., and at a temperature of the order of 500° F.; breaks up the air into small bubbles with perforated plates; and passes the bubbles through water at a temperature of the order of 300° F.; thus causing evaporation to take place from the body of the water into bubbles of air, and concentrating the dissolved solids in the water. This method avoids such turbine blade deposits as would take place when water is sprayed into the air, in a similar power plant system. In the latter method, the finer particles will evaporate to dryness and the minute particles formed from the solids dissolved in the water will then pass with the steam to the turbine blades and deposit thereon.

The use of the invention increases the availability of a gas turbine power plant, as well as reduces maintenance costs by reducing deposits on the turbine blades. Its use also increases the power output of such a power plant to the extent of 30 to 40%.

Apparatus constructed in accord with the invention involves, for example, a pressure vessel, means forming a gas inlet so associated with the lower part of the pressure vessel as to form a liquid or water space within the vessel, means presenting a gas outlet at the upper part of the pressure vessel, vertically spaced and horizontally arranged bubble tray devices disposed transversely of the upward gas flow in the pressure vessel, from the gas inlet to the gas outlet, feed liquid (or water) supply means distributing liquid over the uppermost bubble tray devices for downflow of the liquid through successive bubble tray devices to the liquid space, means recirculating feed liquid from said space to a position or elevation above a number of the lower bubble tray devices, and flow controlling means coordinating the flow rates of recirculating feed liquid and gas in such a way that the recirculating liquid flow increases as the gas flow decreases.

The invention also involves the above combination modified by a gas bypass leading from the gas inlet directly to the gas outlet and bypassing the bubble tray devices. The gas flow through this bypass may be varied and controlled from gas temperature at a position downstream of the pressure vessel gas outlet and downstream of the bypass outlet where the bypassed gases may be mixed with the humidified and cooled gases to maintain the desired temperature at the control position.

The invention is also considered as comprehending the gas humidifying method effected by the apparatus, the method involving the maintenance of a predetermined solids concentration of the humidifying liquid which is recirculated through some of the humidifying positions. This method also involves the washing of the humidified gas with relatively pure feed water above the recirculating zone, and the separation of the wash water from the gas. The separated water, with its concentration increased, passes to the recirculating zone to join a body of liquid at the bottom of the pressure vessel. This body of liquid is subject to blowdown, and also communicates with means for circulating the liquid to a position above the main humidification zone. The blowdown may be controlled from a water level controller which maintains a predetermined height of water in the pertinent space.

Most of the gas humidification takes place in the lower bubble trays, leaving the upper trays to serve as water washers to reduce solids concentration in entrained water droplets leaving the lower trays. Beyond the upper trays there is effected a separation of humidified gas and moisture carryover.

The invention is clearly and concisely set forth in the claims appended hereto, but for a complete understanding of the invention, its uses and advantages, recourse should be had to the following description which refers to the accompanying drawings in which preferred embodiments of the invention are disclosed.

In the drawings:

Fig. 1 is a vertical section through the pertinent evaporator-humidifier unit;

Fig. 2 is an inverted plan, looking upwardly at the bottom of the Fig. 1 unit;

Fig. 3 is a fragmentary view in the nature of a horizontal section on the line 3—3 of Fig. 1, looking downwardly upon the top of the annular weir liner over the top of which spills the humidifying liquid which is subject to continuous recirculation;

Fig. 4 is a fragmentary vertical section on the line 4—4 of Fig. 3, showing the construction at the top of the weir liner;

Fig. 5 is a fragmentary vertical section showing the construction of the multiple plate scrubber which has a gas drying action at the top of the unit by separating droplets of liquid suspended in the upwardly moving gaseous medium;

Fig. 6 is a flow diagram showing the use of the illustrative evaporator-humidifier in a gas turbine cycle;

Fig. 7 is a control diagram illustrating apparatus for controlling the fluid flows, in the operation of the illustrative unit;

Figure 8:
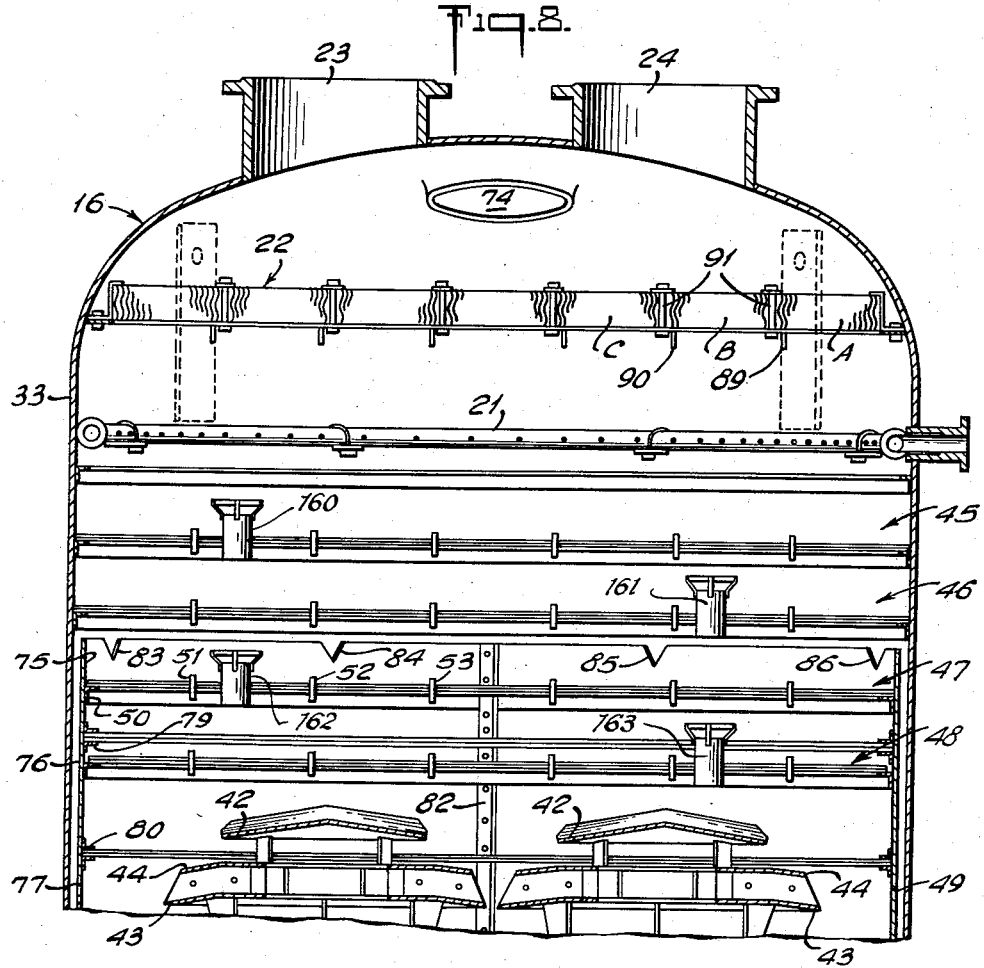
Fig. 8 is a partial vertical section of a modification of the Fig. 1 unit incorporating air bypass constructions.

For an understanding of the use and advantages of the pertinent evaporator-humidifier unit, reference may be made to Fig. 6 which diagrammatically illustrates a gas turbine cycle including the illustrative evaporator-humidifier unit. In this cycle, atmospheric air at, for example, 80° F. temperature and 14.7 p. s. i. a. enters the compressor 10. Air leaves the compressor through the line 11 at 90 p. s. i. a. and at a temperature of the order of 500° F. and passes through the branch lines 12 and 13 to the large diameter air inlets 14 and 15 of the evaporator-humidifier unit indicated generally by the numeral 16. In this unit the air is cooled to 190° F. (approximate) and humidified to saturation or near saturation by the passage of air bubbles upwardly through water moving downwardly through a series of bubble trays. The upper trays are supplied with relatively pure feed water delivered to a feed water heater 17 by a pump 18 and connecting line 19. Feed water, heated to 300° F., for example, passes from the heater 17 through a line 20 to a perforated distributor pipe 21 disposed above the uppermost bubble tray of the evaporator-humidifier unit.

Air suspended water droplets are separated from the air by the multiple plate scrubber 22, and the humidified air at 190° F. then passes through the air outlets 23 and 24 and the connected lines 26, 27 and 28 to a regenerator, or air heater 29. From the regenerator the air passes to the fuel burning combustor 30 at a temperature of the order of 800° F., and thence the combustion gases pass through the line 31, at a temperature of the order of 1400° F., to the gas turbine 32. The latter directly drives the compressor 10.

In such a gas turbine cycle, the use of the illustrative evaporator-humidifier unit has resulted in an increase of power output of the order of 40% and an accompanying increase in overall cycle efficiency of the order of 5%. In one test, for example, a 5000 H. P. turbine produced more than 7000 H. P.

The general structural characteristics of the pertinent unit are indicated in Fig. 1 of the drawings, with some of their details indicated in Figs. 2–5. The unit involves a pressure vessel 33 which, for example, has a height of the order of twelve feet and a diameter of the order of nine feet. It is of welded construction with the weld seams X-rayed and the vessel stress relieved. It is hydrostatically tested at a pressure of 150 p. s. i.

The air inlets 14 and 15, at the bottom of the vessel are formed, in part, by the nozzles 34 and 35, flanged and welded in the positions shown in Fig. 1. Inside the pressure vessel these nozzles have frustro-conical extensions 36 and 37 welded thereto with their upper ends of larger diameter, as shown. The nozzles, with their extensions have thermal protector sleeves or liners 38 and 39 welded to the nozzles and their extensions so as to leave an annular space between each liner and the combined nozzle and extension. The liners project above the tops of the extensions 38 and 39 in top rings 40 and 41. Each of these rings has an umbrella-like hood structure secured thereto, including the superposed and vertically spaced elements 42, 43 and 44. These elements function to distribute the upward gas or air flow over the bubble tray areas, and to prevent the downflowing water from falling into the air inlets.

At successive levels, above the levels of the hoods (42—44) there are fixed and vertically spaced bubble tray devices indicated generally at 45—48. The upper two, 45 and 46, are fixed to the pressure vessel wall at elevations above the top of the weir liner 49, and the lower two, 47 and 48, are fixed to the upper part of the weir liner at the positions indicated in Fig. 1. Otherwise, the bubble tray devices are of uniform and similar construction. Each, for example, includes a bubble tray support ring 50 fixed to the pressure vessel wall or the weir liner, as the case may be. Each such ring has secured thereto a plurality of panel support bars such as 51—53, arranged as parallel chords of the circle represented by the associated support ring 50.

The bottom of each bubble tray device is formed by a series of perforated metallic panels, having their areas covered, for example, by a myriad of 3/16" diameter openings, on 1/4" centers. Their relation to the panel support rings and bars is best shown in Figs. 3 and 4. In Fig. 4, the perforated panel 54 is shown as having its left hand edge or marginal portion clamped between the support ring 50 and the clamp bar 55 by the bolts 56. At its right hand marginal portion there is an upstanding flange 57, and the adjoining panel 58 has a similar upstanding flange 59. These flanges are disposed on opposite sides of the bar 51 and are tightly secured thereto by bolts 60. Suitable gaskets may be used along the margins of the perforated panels, it being understood that each bubble tray device is so constructed that, in operation, the liquid passes downwardly therefrom, only through the openings in the panels. Simultaneously, gas or air is passing upwardly through the openings. This action promotes humidification efficiency by intimate contact of gas or air and counter-current liquid at thousands of positions. The gas or air, then separated into bubbles by the small openings and the above indicated action, passes upwardly through the body of liquid in the tray device, above the perforated panel. In these actions, relatively few liquid droplets are evaporated to dryness, thus affording little entrainment of small solid particles in the gas or air. Any solid particles escaping the lowest bubble tray together with entrained liquid droplets will be washed or scrubbed in passing through the upper bubble trays 45 and 46 which are supplied with relatively pure feed water from the perforated distributor pipe 21 and its associated feed water system. Further entrainment elimination may be effected by the corrugated multiple plate scrubber 22, disposed above the upper bubble tray 45, and if unusual operative conditions should require further gas drying action the gas or air bypass 61 may be brought into operation. This bypass is indicated diagrammatically in Fig. 6 as constituting a duct leading from the gas inlet 14 to the gas outlet 23. Gas flow through the duct is controlled by a flow regulator 62, preferably subject to automatic control from gas or air temperature in the line 27 or the line 28, it being understood that the other air inlet 15 may have a similar bypass construction associated therewith.

Each of the bubble tray devices 45—48 with its associated liquid and gas supply systems may be considered as providing a separate gas and liquid contact zone, the major, if not predominant part, of the gas humidification taking place in the zones of the lower bubble tray devices 47 and 48 which, collectively, may therefore be considered as a super-zone of main gas humidification. Such a high degree of humification in this super-zone is promoted by a liquid recirculation system which ensures a supply of an increased amount of liquid to the bubble tray devices 47 and 48. This liquid recirculation system includes the recirculating pump 63, with its supply line 64 leading from the lined nozzle 65 which communicates through the perforated outlet pipe elements 66—68 with a body of the recirculated liquid maintained beneath the normal liquid level 69. The discharge line 70 of the pump 63 leads to the nozzle 71 which communicates with the annular recirculated liquid chamber 72. The inner wall of this chamber is presented by the weir liner indicated generally by the numeral 49.

The weir liner is of sectional construction with the sections of such size that they may be passed into the pressure vessel through one of the man-way access openings 73 or 74 which are provided with removable pressure tight closures. The weir liner sections preferably form superposed and vertically aligned rings 75—78 flanged and bolted together with interposed gaskets, as indicated at 79—81. Each ring may be made up of arcuate sections secured to upright junction angles 82. The top ring 75 is preferably provided with notches 83—86 in its upper marginal portion, for distributing the spill-over of recirculated liquid to the bubble tray device 47. The bottom ring is welded to the pressure vessel as indicated at 87.

The weir liner is in effect, a concentric baffle, providing, with the adjacent pressure vessel wall, an annular chamber which is filled with recirculating liquid, thus providing for control of the shell temperature. The annular body of liquid thus enclosed extends below the minimum water level so that the entire shell from the air or gas inlet to the second tray bubble tray level will be at the liquid temperature. Above this point the gas or air will be at essentially the same temperature as the liquid. Therefore the entire shell will be essentially at the same temperature.

The scrubber 22 consists of several rectangular units of multiple parallel corrugated plates, such units being indicated at A, B and C in Fig. 1. They are secured to a support ring 88 to which parallel cross bars such as 89 and 90 are fixed. The sections such as A, B and C are held to the cross bars and the support ring by tie-bolts 91.

The normal water level 69 at the bottom of the unit and within the weir liner ring 78 is preferably automatically maintained, and it is visually indicated by the gauge glass 92 which communicates with the pressure vessel water and gas spaces respectively, by the lower connections 93 and the upper connections 94.

The solids concentration of the recirculating water is maintained at a low value by blowdown, which may be controlled by the valve 95 (Fig. 6) in a branch line 96 leading from a T 97, in the pump supply line 64. The operation of the valve 95 is preferably automatically governed from liquid level variations through the liquid level recorder controller 98 (Fig. 7) appropriately connected to the liquid space having the liquid level 69. This control unit operates through the pilot valve 99 to controllably vary the pneumatic loading in the line 100 leading to the relay 101. The output of the relay 101 varies the pneumatic loading of the line 102 leading to the selector valve 103. Line 104 leads from the selector valve to the valve operator 105 (or servo-motor) which is effective upon the valve 95. The control elements are preferably so set that the valve 95 is opened automatically only when the liquid level is within a restricted range, near normal level.

The recorder-controller 98 is also effective upon the control of flow of feed liquid through the line 106 which leads to the liquid distributor 21. To this end a control impulse transmitted through the line 100 is continued through the line 107 as one of the incoming control influences of the totalizing relay 108. The latter modifies this control influence by representations of feed liquid flow variations transmitted thereto through the liquid flow recorder-controller 109, its pilot valve 110, and the line 111. The controller 109 is appropriately connected to the feed liquid line 106 on opposite sides of the orifice 112 by lines 113 and 114.

The input control impulses of the totalizing relay 108 also include pulses which are representations of air or gas flow, preferably through the inlets 14 and 15. For this purpose the air or gas flow recorder-controller 115 is appropriately connected to the inlets, as by the line 116 and its branches 117 and 118. The controller 115 acts through its pilot valve 119 to effect variations in the pneumatic loading of the line 120 and its branches 121 and 122. These variations or pulses are transmitted as representations of changes in air or gas flow to the totalizing relay 108 and to the reversing relay 124. Thus the operative loading of the output line 125 of the totalizing relay 108 is a combined effect of three incoming influences; i. e., changes in liquid level, changes in feed liquid flow, and changes in air or gas flow.

The relay 108 is preferably of a type in which the relative effectiveness of the incoming influences is subject to control by the setting of the relay. It may be of the type shown by the U. S. patent to Dickey 2,098,913. In the illustrative control system the flow of feed liquid through the line 106 to the unit is proportioned from air or gas flow by way of the water or liquid flow controller 109 and the air or gas flow recorder-controller 115, both of which are effective through the relay 108. The output of the latter, transmitted to the valve operator 126, directly controls the valve 127. A selector valve (manual or automatic) 128 is interposed in the line 125 in order that the valve 127 may be manually operated when desired.

In order that the rate of flow of recirculated liquid through the pump 63 and its lines 64 and 70 to the annular liquid chamber 72 may be increased as gas flow decreases, the control impulse in the branch line 121 (from the gas flow recorder-controller 115) is effective upon the reversing relay 124. The reversed output pulses from this relay are effective upon the valve 130 through the line 131, the selector valve 132, the line 133, and the valve operator 134.

The illustrative method of control of recirculation of the humidifying liquid results in a substantial increase in the operating range of the unit.

With further reference to the control system diagrammatically indicated in Fig. 7, the pilot valves 99, 110 and 119, mechanically controlled by the recorder-controllers 98, 109 and 115, respectively, are preferably of the type shown and described in the U. S. patent to Johnson, 2,054,464, and the relay 101 may be of the type shown by the U. S. Reissue Patent 21,804 to Gorrie. The selector valves 103, 128 and 132 are illustrated by the U. S. patent to Fitch 2,202,485, and the valve operators 126, 105 and 134 may be of the type shown and described in the U. S. Patent 2,298,257.

Alternative to the gas bypass 61 and the flow regulator 62 arrangement indicated in Fig. 6, the illustrative unit may include internal bypass ducts such as the ducts 140 and 141 of Fig. 1, having their inlets communicating with the gas inlets 14 and 15 through the hoods 42. Air or gas flow through these ducts would be subject to control by the flow regulators 142 and 143 which would preferably be automatically controlled from variations in gas or air temperature in, or downstream of, the pressure vessel outlets 23 and 24.

Figure 9:
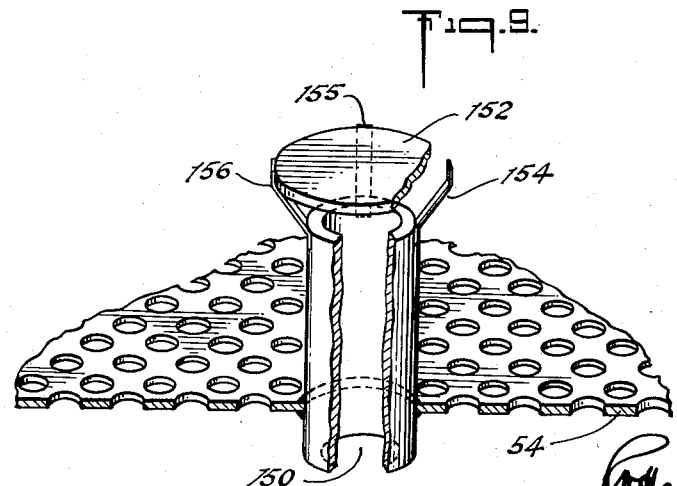
Fig. 9 is a fragmentary view showing the arrangement of one of the air bypass constructions of Fig. 8.

Fig. 9 illustrates an air bypass construction for increasing the maximum vapor capacity of the bubble trays of the unit. This construction includes an upright air bypass tube 150 secured to a perforated plate such as the plate 54 forming the bottom of one of the bubble trays. Each air bypass tube has disposed above its upper outlet end an air deflector plate 152 secured in its operative position by a plurality of supports 154—156 which are preferably circumferentially spaced around the tube 150 and fixed to the tube and to the plate 152.

The air bypass construction of Fig. 9 is preferably secured to vertically successive bubble trays such as 45—48 in staggered positions such as indicated at 160—163 in Fig. 8. They are staggered to prevent laning by bypassed air through all of the trays.

As to the effects of the air bypass construction, if it be assumed that the illustrative unit has four bubble trays, with 20% of the air bypassed by the bypass construction, the maximum flow of air of the unit would be increased approximately 20%.

In the illustrative unit the air or gas is humidified in such a way that no water particles are completely evaporated. The air, for example, is bubbled through solid water, thus eliminating the necessity of scrubbing out suspended particles.

The illustrative unit is characterized by extremely low pressure drop, and its counterflow operation, with high solids concentration in only the last stages, facilitates the problem of removing excess unevaporated moisture.

In the multiple tray arrangement of the unit any solid particles which escape the first tray together with entrained liquid droplets are scrubbed by passing through the remaining trays.

The illustrative method of recirculating the humidifying liquid to the lower bubble tray devices not only maintains pressure vessel metal temperature gradients within allowable limits, but also:

(1) Maintains the bubbling action in the lower tray in which most of the evaporation takes place;

(2) Permits the scrubbing of the cooled saturated air in the upper trays with incoming feed water while evaporating water in the bottom tray to the highest permissible solids concentration; and (3) Increases the quantity of evaporated water and temperature of saturated air leaving the unit by counterflow heat transfer.

Whereas the invention has been described with reference to the details of preferred embodiments thereof, it is to be appreciated that the invention is not to be considered as limited to all of the details thereof. It is rather to be considered as of a scope indicated by the subjoined claims.

What is claimed is:

1. In gas and liquid contact apparatus, pressure vessel means, heated gas inlet passage means so associated with the lower part of the pressure vessel as to extend upwardly through a liquid space beneath a normal liquid level within the vessel, means presenting a gas outlet at the upper part of the pressure vessel, means maintaining gas flow from the inlet to the outlet, vertically spaced bubble tray devices disposed above said liquid space and said normal liquid level transversely of the path of the gas flow, each of said devices having a myriad of small perforations in its bottom, liquid supply means for distributing liquid over the uppermost bubble tray device for subsequent downflow of the liquid through the successive bubble tray devices to said liquid space, means recirculating liquid from said liquid space to a position above at least one of the lower bubble tray devices, and flow controlling means co-ordinating the flow rate of recirculating liquid and the flow rate of gas through said inlet in such a way that the flow of recirculating liquid increases as the gas flow decreases.

2. In gas and liquid contact apparatus, pressure vessel means, heated gas inlet construction passage means so associated with the lower part of the pressure vessel as to extend upwardly through a liquid space beneath a normal liquid level within the vessel, means presenting a gas outlet at the upper part of the pressure vessel, means vertically maintaining gas flow from the inlet to the outlet, vertically spaced bubble tray devices disposed above said liquid space and said normal liquid level and transversely of the path of gas flow from the inlet to the outlet, each of said devices having a myriad of small perforations in its bottom, liquid supply means for distributing liquid over the uppermost bubble tray device for subsequent downflow of the liquid through the successive bubble tray devices to said liquid space, means recirculating liquid from said space to a position above at least one of the lower bubble tray devices, and means for increasing the recirculated liquid flow as the gas flow decreases.

3. In gas and liquid contact apparatus, pressure vessel means, a heated gas inlet associated with the lower part of the pressure vessel, means presenting a gas outlet at the upper part of the pressure vessel, means maintaining gas flow from the inlet to the outlet, vertically spaced bubble tray devices disposed transversely of the path of gas flow from the inlet to the outlet, each of said devices having a myriad of small perforations in its bottom, means for supplying liquid for downflow through the successive bubble tray devices, duct means acting as a gas bypass and bypassing some of said gas flow around some of said bubble tray devices, and means for controlling the flow of gas through the duct means to control the condition of the gas leaving the apparatus.

4. In gas and liquid contact apparatus, a pressure vessel, means forming a heated gas inlet associated with the lower part of the pressure vessel, means presenting a gas outlet at the upper part of the pressure vessel, vertically spaced bubble tray devices disposed transversely of the path of gas flow from the inlet to the outlet, each of said bubble tray devices having a myriad of small perforations in its bottom, means for supplying liquid for subsequent downflow of the liquid through the successive bubble tray devices, a gas bypass duct or conduit having a gas inlet communicating with said gas flow below at least a plurality of said bubble tray devices and having an outlet communicating with said gas flow beyond said plurality, and means controlling the amount of gas flow through the bypass duct.

5. In a gas humidification method, establishing successively spaced zones of gas and liquid contact, maintaining humidifying liquid in said zones, maintaining gas flow through the liquid in said zones with the first gas contacted zones constituting a super zone of main humidification in which the predominant part of the total humidification takes place, washing the gas with higher purity liquid supplied to the contact zones beyond the super zone in a gas flow sense, separating liquid droplets from the gas beyond the washing zone, an excess of humidifying liquid being supplied to the super zone, and recirculating the humidifying liquid to the super zone at a rate inversely proportional to the rate of gas flow, said recirculation of liquid being limited to the super-zone.

6. In a gas humidification method, establishing successively spaced zones of gas and liquid contact, maintaining humidfying liquid in said zones, maintaining flow of said liquid in one direction throughout said zones and from zone to zone, maintaining gas flow through the liquid in said zones with the first gas contacted zones constituting a super zone of main humidification in which the predominant part of the total humidification takes place, the gas flow being counter-current relative to the liquid flow, washing the gas with high purity liquid supplied to the contact zones beyond the super zone, separating liquid droplets from the gas beyond the washing zone, recirculating the humidifying liquid to the super zone to supply an excess of humidifying liquid to the super-zone, and controllably varying the recirculation of the humidifying liquid to the super-zone at a rate inversely proportional to the rate of gas flow through said zones, the gas washing liquid being of a purity higher than that of the recirculated liquid.

7. In a gas humidification method, establishing successive and spaced zones of gas and liquid contact, maintaining moving liquid supplies in said zones by constant liquid replenishment, creating and maintaining gas flow in one direction through and in contact with the liquid in said zones with the first gas contacted of said zones constituting a main humidification super zone in which the predominant part of the total humidification takes place, the liquid supplied to the following contact zones beyond the super zone being of relatively higher purity whereby washing of the humidified gas takes place in the following contact zones, separating suspended liquid droplets from the gas at a position beyond the washing zone, supplying an excess of humidifying liquid to the super zone, recirculating said excess of humidifying liquid to the contact zones of the main humidification zone, and increasing the flow of recirculating liquid when the gas flow decreases to increase the operating range of the method.

8. In gas and liquid contact apparatus, pressure vessel means, a heated gas inlet so associated with the lower part of the pressure vessel as to extend through a liquid space beneath a normal liquid level within the vessel, means presenting a gas outlet at the upper part of the pressure vessel, means maintaining gas flow from the inlet to the outlet, vertically spaced bubble tray devices disposed transversely of the path of gas flow from the inlet to the outlet, each of said devices having a myriad of small perforations in its bottom, liquid supply means for distributing liquid over the uppermost bubble tray device for subsequent downflow of the liquid through the successive bubble tray devices to said liquid space, an annular weir liner embracing the lower bubble tray devices and fixed concentrically within the lower part of the pressure vessel shell to provide therewith an annular liquid chamber extending from a level below said normal liquid level to a level above the lowermost bubble tray device, and means independent of said liquid supply means recirculating liquid from said space and through said annular liquid chamber for spillover therefrom to a bubble tray device above the lowermost of said devices.

9. In the operation of a gas humidifier having a plurality of superposed and vertically spaced bubble trays within a closed vessel, the method which involves effecting the movement of a relatively dry gaseous medium upwardly through a multiplicity of small openings in the bottoms of the bubble trays and through a liquid within the bubble trays, the maintaining of a body of humidifying liquid within each of a group of the lower bubble trays by recirculating the liquid from a position beneath the lowermost tray of the group to the uppermost tray of the group, washing the humidified gaseous medium rising from the lower trays through liquid in the upper trays by maintaining a washing liquid of relatively higher purity from a source separate from said recirculated liquid within the uppermost trays for upward passage of the gaseous medium therethrough, and subjecting the gaseous medium flow from the uppermost trays to further gaseous medium drying action.

10. In liquid and gas contact apparatus, a pressure vessel having therein a plurality of vertically spaced and superposed bubble trays for successive zones of liquid and gas contact, a weir liner spaced inwardly from the lower part of the wall of the pressure vessel to provide therebetween an annular liquid space with liquid overflow over the top of the liner to a group of lower bubble trays disposed within the liner, means for circulating liquid from the lower part of the pressure vessel to said annular chamber to thereby maintain said overflow, means supplying gas to the lower part of the pressure vessel space within the weir liner for upward flow of gas through the successive gas and liquid contact zones, means for washing the gases by supplying relatively purer liquid to the upper part of the pressure vessel for downward flow of liquid through all of the liquid and gas contact zones, means constituting an outlet for the humidified gaseous medium at the top of the pressure vessel, and gas by-pass duct means controllable from gas outlet temperature and leading from a gas space at the lower part of the pressure vessel past the gas and liquid contact zones to the gas outlet space at the top of the pressure vessel.

11. In liquid and gas contact apparatus, a pressure vessel having therein a plurality of vertically spaced and superposed bubble trays for successive zones of liquid and gas contact, a weir liner spaced inwardly from the lower part of the wall of the pressure vessel to provide therebetween an annular liquid space with liquid overflow over the top of the liner to a group of lower bubble trays disposed within the liner, means for circulating liquid from the lower part of the pressure vessel to said annular chamber to thereby maintain said overflow, means supplying gas to the lower part of the pressure vessel space within the weir liner for upward flow of gas through the successive gas and liquid contact zones, means for washing the gas by supplying relatively purer liquid to the upper part of the pressure vessel for downward flow of liquid through all of the liquid and gas contact zones, means constituting an outlet for the humidified gaseous medium at the top of the pressure vessel, and gaseous medium by-pass means for increasing the maximum vapor capacity of the unit, said by-pass means including an upright bypass tube for each of several of the gas and liquid contact zones, each bypass tube extending upwardly from the lower part of a gas and liquid contact zone and terminating below the next vertically successive zone, the gas bypass tubes for successive zones being substantially horizontally offset or arranged at staggered positions with reference to the general direction of the flow of gases through the unit.

References Cited in the file of this patent

UNITED STATES PATENTS

| | | |
|---|---|---|
| 1,848,945 | Genter | Mar. 8, 1932 |
| 2,143,628 | Lea | Jan. 10, 1939 |
| 2,560,978 | Persson et al. | July 17, 1951 |
| 2,568,749 | Kittel | Sept. 25, 1951 |
| 2,608,266 | Wintermute | Aug. 26, 1952 |
| 2,682,394 | Guthrie et al. | June 29, 1954 |
| 2,733,054 | Van Ackeren | Jan. 31, 1956 |

FOREIGN PATENTS

| | | |
|---|---|---|
| 302,325 | Germany | Dec. 17, 1917 |